No. 748,218. PATENTED DEC. 29, 1903.
L. F. ROGALLA, B. J. NARLOCH & H. C. DE PUY.
WHEEL SCRAPER.
APPLICATION FILED AUG. 1, 1903.
NO MODEL.
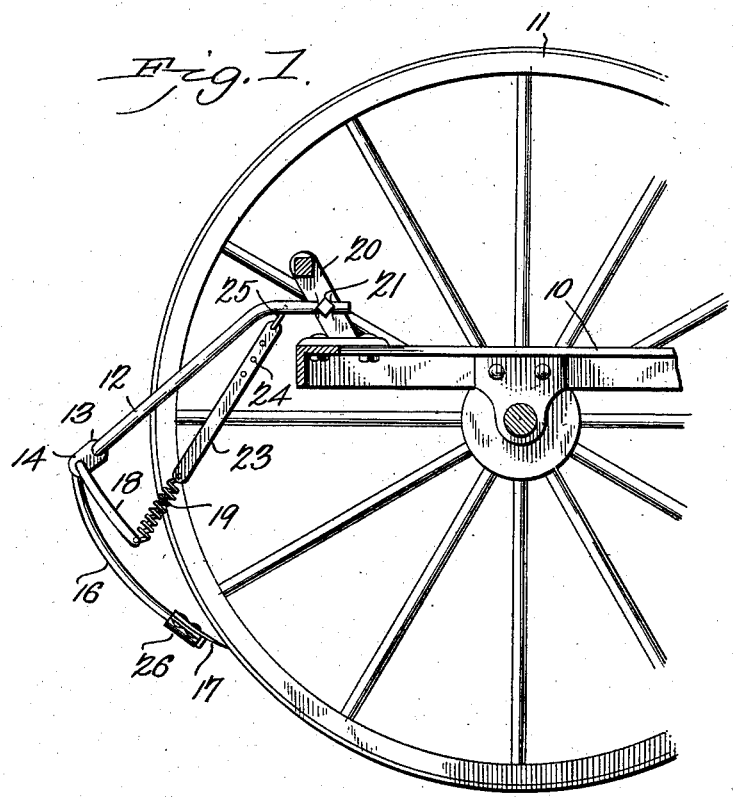
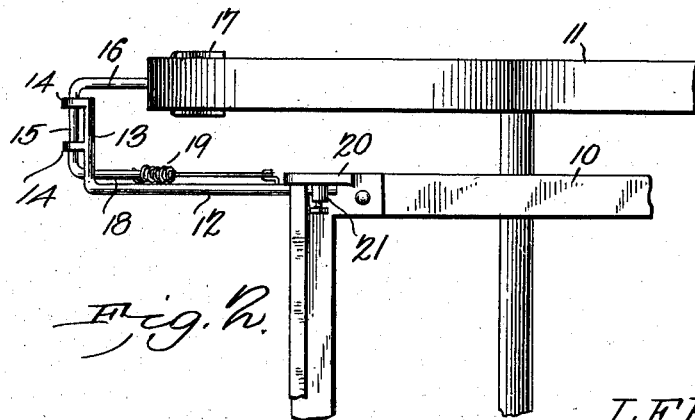
Witnesses
E. F. Stewart
C. N. Woodward
L. F. Rogalla,
B. J. Narloch and
H. C. De Puy,
Inventors.
by C. A. Snow & Co.
Attorneys No. 748,218. Patented December 29, 1903.

UNITED STATES PATENT OFFICE.

LARRY FELIX ROGALLA, BERNARD J. NARLOCH, AND HERBERT C. DE PUY, OF MINTO, NORTH DAKOTA.

WHEEL-SCRAPER.

SPECIFICATION forming part of Letters Patent No. 748,218, dated December 29, 1903.

Application filed August 1, 1903. Serial No. 167,938. (No model.)

*To all whom it may concern:*

Be it known that we, LARRY FELIX ROGALLA, BERNARD J. NARLOCH, and HERBERT C. DE PUY, citizens of the United States, residing at Minto, in the county of Walsh and State of North Dakota, have invented a new and useful Wheel-Scraper, of which the following is a specification.

This invention relates to devices adapted to be employed upon vehicles of various kinds to prevent the adherence of the earth thereto, more particularly to the various forms of agricultural machinery mounted upon bearing-wheels, and has for its object to simplify and improve devices of this character; and the invention consists in certain novel features of construction, as hereinafter shown and described, and specified in the claims.

The improvement may be applied to any form of wheeled vehicle or to agricultural or other machinery mounted upon bearing or traction wheels, but for the purpose of illustration is shown applied to a portion of a conventional form of a seed-planter frame, Figure 1 being a side elevation, and Fig. 2 a plan view, of the same.

In both the figures of the drawings corresponding parts are denoted by like designating reference characters.

The framework of the seeder is represented at 10 and one of the bearing-wheels at 11, of any approved form.

The improved device consists of a standard 12, having its free end 13 bent off at right angles to cause it to extend past the adjacent face of the wheel 11, and it is provided with spaced bearings 14, in which an arm 15 is rotatively mounted, as shown. One end of the arm 15 is bent downwardly, as at 16, and provided with a scraper 17, adapted to engage the outer surface of the wheels 11, while the other end 18 is likewise bent downwardly and provided with a spring 19, operating to maintain the scraper yieldably in engagement with the wheel 11.

Attached to some part of the framework of most forms of seeding and similar machines are brackets, standards, or other projections in proper position to support the standard 12, and in the form chosen for illustrating the operation brackets or hangers 20 are found in convenient position for this purpose. It will be understood, of course, that one of the devices will be attached to each wheel, but as both sides are precisely alike one only is shown. It will also be understood that where brackets or standards or other projections are not found in suitable position on the machine to which the device is to be applied a specially-formed bracket will be employed, or the device attached to some convenient portion of the frame or running-gear, and we do not, therefore, desire to be limited to any specific means whereby the device may be connected. Generally, however, keepers or clips 21 of suitable form will be employed to support the standards 12 upon the bracket 20, as shown, and preferably connected thereto, as by set-screw 22.

The standard 12 is bent downwardly, as shown, so that the scraper member 17 will operate at as low a point as possible upon the wheel-rim, and thus avoid undue elevation of the material to be scraped therefrom.

The spring 19 will preferably be connected to a bar 23, provided with a plurality of spaced apertures 24, adapted to be connected by a a hook 25 to the standard 12, as shown. By adjusting the bar 23 by means of the holes 24 it is obvious the tension of the spring 19 may be regulated to any desired extent.

The scraper 17 will preferably be swiveled upon the arm 16, as shown at 26, so that the scraper will readily adapt itself to the irregularities of the surface of the wheel.

By this simple arrangement a scraper is provided which will effectually prevent the accumulation of mud or other matter from adhering to the wheels and will run in constant yieldable engagement therewith by the action of the spring 19.

The device may be readily applied to any form of wheeled vehicle with very slight and unimportant modifications and changes; but these would not be a departure from the principle of the invention or sacrifice any of its advantages.

Having thus described the invention, what we claim is—

1. A vehicle-wheel scraper comprising a standard stationary with the running-gear of the vehicle and extended laterally at the free end, an arm mounted for oscillation upon said laterally-extended end and having its ends projecting downwardly, a scraper carried by one of said projecting ends and a spring connected to the other projecting end and operating to maintain said scraper in yieldable engagement with the vehicle-wheel, substantially as specified.

2. A vehicle-wheel scraper comprising a standard stationary with the running-gear of the vehicle, an arm mounted for oscillation upon said standard, a scraper carried by one end of said arm, a spring connected by one end to the other end of said scraper-arm, and a connecting-bar between the free end of said spring and said standard, substantially as specified.

3. A vehicle-wheel scraper comprising a standard stationary with the running-gear of the vehicle, an arm mounted for oscillation upon said standard, a scraper carried by one end of said arm, a spring connected by one end to the other end of said scraper-arm, a hook carried by said standard, and a connecting-bar connected to the free end of said spring and provided with a plurality of spaced apertures and adapted to be adjustably connected thereby to said hook, substantially as specified.

In testimony that we claim the foregoing as our own we have hereto affixed our signatures in the presence of witnesses.

LARRY FELIX ROGALLA.
BERNARD J. NARLOCH.
HERBERT C. DE PUY.

Witnesses:
  Jos. S. Rogalla,
  B. J. Narloch,
  Wm. G. Bell.